United States Patent [19]
Minagi

[11] 3,899,163
[45] Aug. 12, 1975

[54] WELDING JIG FOR DECK LONGITUDINALS

[75] Inventor: Sakebu Minagi, Ichiharashi, Japan

[73] Assignee: Mitsui Shipbuilding and Engineering Co., Ltd., Tokyo, Japan

[22] Filed: Aug. 20, 1974

[21] Appl. No.: 499,063

[30] Foreign Application Priority Data
Aug. 27, 1973 Japan.............................. 48-100556

[52] U.S. Cl. ........................ 269/37; 29/493; 228/6; 228/44
[51] Int. Cl. .......................................... B23k 37/04
[58] Field of Search ............... 29/493; 228/4, 6, 44; 269/37, 43, 240, 249

[56] References Cited
UNITED STATES PATENTS
| | | | |
|---|---|---|---|
| 2,031,398 | 2/1936 | Wagoner | 269/37 X |
| 3,556,508 | 1/1971 | Varga | 269/37 UX |
| 3,659,333 | 5/1972 | Johnson et al. | 29/493 X |
| 3,807,017 | 4/1974 | Une et al. | 228/44 X |

Primary Examiner—Al Lawrence Smith
Assistant Examiner—James G. Smith
Attorney, Agent, or Firm—Howson and Howson

[57] ABSTRACT

A welding jig for deck longitudinals which is capable of aligning the deck longitudinals in constructing a hull and also securing the copper plates for electroslag welding. To this end the jig according to the present invention may be secured to one of the longitudinals and provided with means for forcing the other longitudinal into alignment and means for securing the copper plates for electroslag welding.

1 Claim, 3 Drawing Figures

WELDING JIG FOR DECK LONGITUDINALS

The present invention relates to a welding jig which is capable of aligning deck longitudinals in constructing a hull and also securely holding the copper plates for welding the deck longitudinals.

In conventional methods in order to align the opposite deck longitudinals, a plurality of holding pieces are welded and wedges are driven between the holding pieces and longitudinal. Further, in order to hold the copper plates for electroslag welding on the longitudinals, a plurality of pieces for holding bolts must be welded. These operations have required much labor and time as well as highly skilled techniques.

The object of the present invention is to provide a welding jig which is capable of aligning the lower parts of opposite deck longitudinals and also accomplishing consumable nozzle electroslag welding without using any assistant welding pieces.

The present invention is now described in detail with reference to the accompanying drawings, in which.

Figure 1:
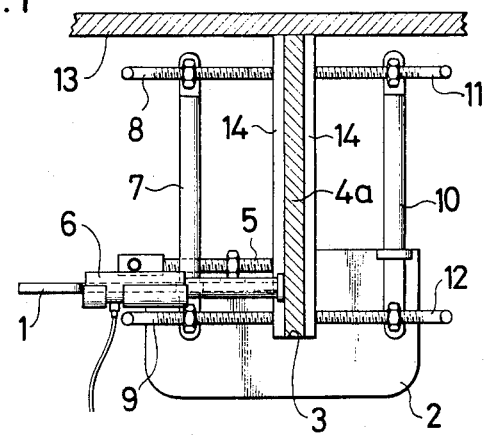
FIG. 1 is a side view showing the welding jig according to the present invention as employed in welding the opposite deck longitudinals.
Figure 2:
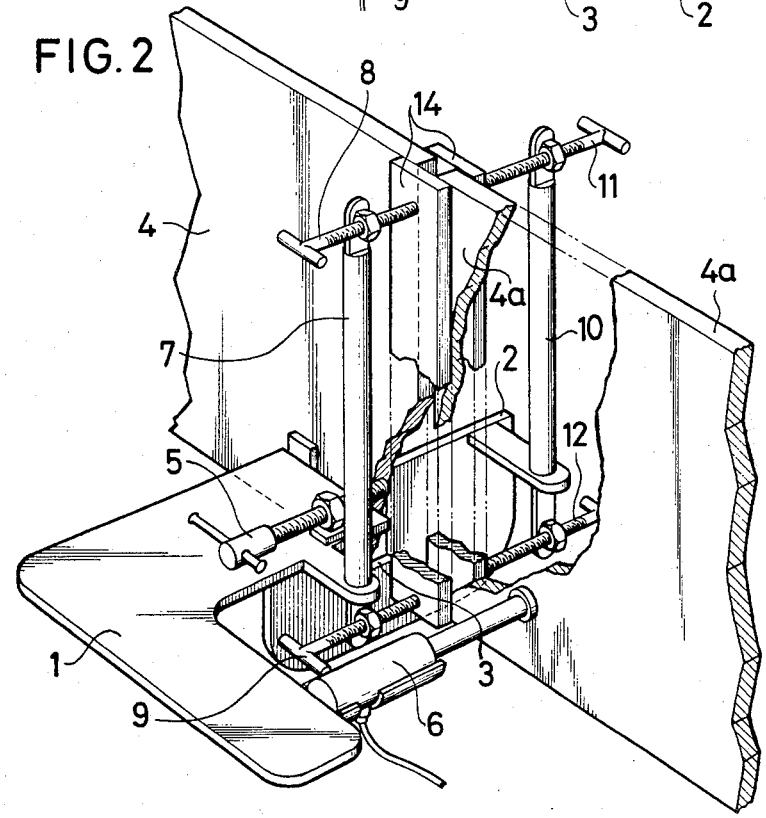
FIG. 2 is a perspective view thereof.

Referring to FIGS. 1 and 2, a jig according to the present invention comprises an L-shaped horizontal support plate 1 and a U-shaped vertical support plate 2 which is welded perpendicularly to the underside of said horizontal support plate 1. The vertical support plate 2 has a recess 3 with which a deck longitudinal 4 can be engaged. On the horizontal support plate 1, a fixing screw 5 for fixing said plate to said longitudinal 4 and an oil hydraulic cylinder 6 are provided, said screw 5 and oil hydraulic cylinder 6 being disposed horizontally and directed toward the longitudinal 4. A post 7 is provided on the support plate 1, and copper plate holding screws 8 and 9 are horizontally provided on upper and lower ends of the post 7.

Provided on the vertical support plate 2 is a post 10 opposite the post 7, which is also provided with copper plate holding screws 11 and 12 opposite to the screws 8 and 9.

Figure 3:
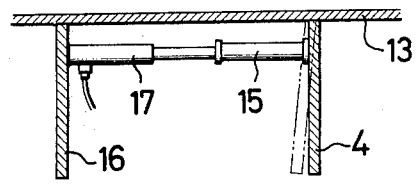
FIG. 3 is a side view illustrating the method of adjusting inclination at the upper part of a deck longitudinal.

In aligning the deck longitudinals 4 and 4a which are tack welded to the underside of the deck 13, first an oil hydraulic cylinder 17 and a suitable rod 15 are disposed between the longitudinal 4 and the adjacent longitudinal 16 and the irregularity at the upper parts of the longitudinal 4 is adjusted as shown in FIG. 3. The longitudinal 4a is also adjusted by the same manner as the longitudinal 4.

Thereafter, as shown in FIGS. 1 and 2, the recess 3 of the support plate 2 is engaged with the lower portion of one of the longitudinals as 4 and the jig body is attached to the longitudinal 4 by screw 5. Then, the lower part of the longitudinal 4a is forced by the oil hydraulic cylinder 6 into alignment with the longitudinal 4. After completion of alignment, a pair of copper plates 14 for consumable nozzle electroslag welding are abutted to the longitudinals 4 and 4a by screws 8, 9, 11 and 12. Thus, alignment of the longitudinals and welding thereof may be performed by the single welding jig.

What is claimed is:

1. A welding jig for deck longitudinals comprising a horizontal support plate which is to be positioned adjacent the side of the deck longitudinals, a vertical support plate secured to said horizontal support plate having a recess with which a lower portion of one of the longitudinals may be engaged, a screw secured to said horizontal support plate for securing the support plates to said one longitudinal, a hydraulic cylinder, attached to said horizontal support plate for aligning the other longitudinal with said one longitudinal, and electroslag welding copper plate holding screws secured to said horizontal and vertical support plates.

* * * * *